United States Patent
Kahnt et al.

(10) Patent No.: US 12,077,112 B2
(45) Date of Patent: Sep. 3, 2024

(54) VEHICLE ELECTRICAL SYSTEM AND POWER MODULE THEREFOR

(71) Applicants: LEONI Bordnetz-Systeme GmbH, Kitzingen (DE); HELLA GmbH & Co. KGAA, Lippstadt (DE)

(72) Inventors: Sebastian Kahnt, Karlstadt (DE); Juergen Krieger, Karlstadt (DE)

(73) Assignees: LEONI Bordnetz-Systeme GmbH, Kitzingen (DE); HELLA GmbH & Co. KGAA, Lippstadt (DE)

( * ) Notice: Subject to any disclaimer, the term of this patent is extended or adjusted under 35 U.S.C. 154(b) by 205 days.

(21) Appl. No.: 17/620,928

(22) PCT Filed: Jun. 19, 2020

(86) PCT No.: PCT/EP2020/067083
§ 371 (c)(1),
(2) Date: Dec. 20, 2021

(87) PCT Pub. No.: WO2020/254566
PCT Pub. Date: Dec. 24, 2020

(65) Prior Publication Data
US 2022/0348156 A1   Nov. 3, 2022

(30) Foreign Application Priority Data

Jun. 21, 2019   (DE) ............... 10 2019 209 026.5

(51) Int. Cl.
*B60R 16/033*   (2006.01)
*B60L 3/04*   (2006.01)
(Continued)

(52) U.S. Cl.
CPC .............. *B60R 16/033* (2013.01); *B60L 3/04* (2013.01); *H02J 1/082* (2020.01); *H02J 7/345* (2013.01);
(Continued)

(58) Field of Classification Search
CPC ......... B60R 16/033; H02J 1/082; H02J 7/345; H02J 2207/50; H02J 2310/48; B60L 3/04
See application file for complete search history.

(56) References Cited

U.S. PATENT DOCUMENTS 6,384,489 B1   5/2002   Bluemel et al.
10,913,356 B2 *   2/2021   Nakamura ................ B60L 3/04
(Continued)

FOREIGN PATENT DOCUMENTS

DE   19846319 C1   2/2000
DE   10053584 A1   5/2002
(Continued)

*Primary Examiner* — Carlos Amaya
(74) *Attorney, Agent, or Firm* — Laurence A. Greenberg; Werner H. Stemer; Ralph E. Locher

(57) ABSTRACT

A vehicle electrical system for a vehicle includes first and second subsystems, each connected to at least one energy source. The first and second subsystems have different voltage levels. At least one safety-relevant load is connected to one of the subsystems, this subsystem having two partial systems, and the load being connected to both partial systems so that the load is connected to the energy source of the subsystem via two separate supply lines. A power module, which connects the two subsystems to each other and is designed such that each of the two supply lines can be connected to both energy sources so that the load can be supplied from both energy sources via both supply lines. There is also described a corresponding power module.

12 Claims, 2 Drawing Sheets

(51) Int. Cl.
*H02J 1/08* (2006.01)
*H02J 7/34* (2006.01)

(52) U.S. Cl.
CPC ....... *H02J 2207/50* (2020.01); *H02J 2310/48* (2020.01)

(56) References Cited

U.S. PATENT DOCUMENTS

2017/0113637 A1    4/2017  Mueller et al.
2018/0001850 A1*  1/2018  Kontani ................... H02J 1/08

FOREIGN PATENT DOCUMENTS

| | | |
|---|---:|---|
| DE | 10150379 A1 | 4/2003 |
| DE | 102005004330 A1 | 8/2006 |
| DE | 102014214103 A1 | 1/2016 |
| DE | 102015222544 A1 | 5/2017 |
| DE | 102016112764 A1 | 1/2018 |
| DE | 102017208030 A1 | 11/2018 |
| WO | 2004042888 A1 | 5/2004 |

* cited by examiner

VEHICLE ELECTRICAL SYSTEM AND POWER MODULE THEREFOR

The invention relates to a vehicle electrical system and a power module for such a vehicle electrical system.

FIELD AND BACKGROUND OF THE INVENTION

A vehicle electrical system is generally used for distributing energy within a vehicle. The vehicle electrical system for this purpose generally has a plurality of power supply lines in order to connect various consumers to one or more energy sources for the purpose of supplying electrical energy to said consumers. The consumers and the energy sources are correspondingly connected to the vehicle electrical system. Some vehicle electrical systems have a plurality of electrical subsystems having different voltage layers in order to be able to operate consumers with different electrical requirements in each case optimally. The electrical subsystems are electrically connected to one another, with the result that, if required, energy can be exchanged between them.

A power module is used for distributing the energy within a vehicle electrical system.

DE 101 50 379 A1 describes an energy supply system for safety-relevant consumers. Energy is supplied to these consumers in each case via two separate power supply lines.

DE 10 2014 214 103 A1 describes a vehicle electrical system topology having two redundant consumers in in each case one of two safety-relevant component electrical systems. One of the component electrical systems is connected to a low-voltage vehicle electrical system, and the other component electrical system is connected to a high-voltage vehicle electrical system. The two vehicle electrical systems are connected via a DC-DC converter. Power can be supplied to the redundant consumers independently of one another from the two vehicle electrical systems.

DE 100 53 584 A1 describes a redundant voltage supply for safety-relevant consumers in a motor vehicle. By virtue of a specific division, it is possible to dispense with DC-DC converters.

SUMMARY OF THE INVENTION

Against this background, it is an object of the invention to specify an improved vehicle electrical system which ensures as high a level of safety as possible with respect to the supply of energy to a safety-relevant consumer. Furthermore, an improved power module for such a vehicle electrical system is intended to be specified.

The object is achieved according to the invention by a vehicle electrical system having the features as claimed in claim 1 and by a power module having the features as claimed in claim 15. Advantageous configurations, developments and variants are the subject matter of the dependent claims. In this case, the statements made in connection with the vehicle electrical system apply accordingly also to the power module, and vice versa.

The vehicle electrical system is designed for use in a vehicle. The vehicle is in particular a motor vehicle, for example a passenger vehicle or a heavy-goods vehicle. The vehicle is in particular driven electrically or by an internal combustion engine or both.

The vehicle electrical system has a first electrical subsystem and a second electrical subsystem, to which in each case at least one energy source is connected, wherein the first electrical subsystem has a different voltage layer than the second electrical subsystem. Accordingly, at least one first energy source is connected to the first electrical subsystem, and at least one second energy source is connected to the second electrical subsystem. The energy source of the respective electrical subsystem fixes the voltage layer thereof. The voltage layer of the respective electrical subsystem specifies which voltage is available in the electrical subsystem for supplying power to consumers. Corresponding to the different voltage layers of the two electrical subsystems, accordingly the two energy stores have different voltages. Preferably, the first electrical subsystem has a lower voltage layer than the second electrical subsystem.

The vehicle electrical system has at least one safety-relevant consumer, which is connected to one of the electrical subsystems, wherein this electrical subsystem has two component electrical systems, and the consumer is connected to both component electrical systems, with the result that the consumer is connected to the energy source of the electrical subsystem via two separate power supply lines. This is in contrast to DE 101 50 379 A1, mentioned at the outset, in which a component is not connected to the same energy source of the corresponding electrical subsystem via two separate connecting lines. In the text which follows, "consumer" will be understood to mean a safety-relevant consumer, if not explicitly specified otherwise. The consumer is in this case connected directly in particular only to one of the electrical subsystems, i.e. not directly to the other electrical subsystem. The energy source is in particular connected to only one of the component electrical systems, but the two component electrical systems are connected to one another in such a way that power is supplied to the two component electrical systems from the energy source. The electrical subsystem is therefore divided into two component electrical systems, and each component electrical system comprises one of the power supply lines, with the result that energy can be supplied to the consumer via different component electrical systems, i.e. the consumer is connected to the energy source with redundancy. In the event of failure of one of the power supply lines or of one of the component electrical systems, a supply of energy still takes place via the other component electrical system using the other power supply line. One or a plurality of comfort consumers which may be present, on the other hand, are each preferably connected only to a single component electrical system, i.e. are not supplied power with redundancy.

A "safety-relevant consumer" is understood to mean a consumer which performs a safety-relevant function, i.e. a safety function. Such consumers are in particular assigned, via a risk classification, to a risk class, "ASIL" (automotive safety integrity level) for short, in particular in accordance with ISO 26262 (more generally IEC 61508), and therefore are also referred to in simplified form as ASIL consumers. A safety-relevant consumer serves the purpose of ensuring the safety and in particular the integrity of a machine, in particular of a vehicle, or of one or more persons, in particular occupants of a vehicle or other road users, or a combination thereof in a reliable and operationally safe manner. Safety-relevant consumers of a vehicle are, for example, a brake system, a steering system, active roll stabilization, a drive system, a chassis control system, an airbag, a system for ensuring the vehicle stability or the like. Safety-relevant consumers should be distinguished from comfort consumers, which do not perform any safety-relevant function, but merely one or more comfort functions. Such comfort consumers are also assigned to the "QM" class and are therefore also referred to as QM consumers.

Examples of comfort consumers are an air-conditioning system, a seat adjustment system, an audio system or the like. For safety-relevant consumers there is generally, for example from the cited standards, the requirement for a redundant energy supply. Such a requirement typically does not exist for comfort consumers.

The vehicle electrical system furthermore has a power module, which connects the two electrical subsystems to one another, and which is designed in such a way that each of the two power supply lines is connectable to the two energy sources, with the result that power can be supplied to the consumer in each case from both energy sources via both power supply lines. This is equivalent to it being possible for power to be supplied to a consumer at one of the electrical subsystems via at least two different component electrical systems of just this electrical subsystem from a plurality of different energy sources which are connected to different electrical subsystems. The consumer is therefore not merely connected to an individual energy source in the same electrical subsystem with redundancy, but is also connected to the energy source from the other electrical subsystem. In addition to the redundancy of the connection, accordingly also redundancy of the energy source is realized. Power can be supplied to the consumer on the one hand via two separate connecting lines and on the other hand also via two separate energy sources.

The power module is used overall for distributing the electrical energy from the energy sources amongst the various electrical subsystems and component electrical systems and therefore advantageously ensures the described redundancy of the energy supply to the consumer. The power module is designed to distribute electrical energy. The power module is preferably an electrical circuit which has, in an expedient configuration, a printed circuit board, on which suitable component parts for realizing the functionality of the power module are arranged and interconnected with one another. Here, "electrical energy" is in particular understood to mean energy for operating a respective consumer, i.e. a certain electrical power is provided so that the consumer can perform a function. This is in contrast to electrical signals or control signals, which are only used for data transmission from or to a consumer and do not transmit any power and therefore are not used for the operation of the consumer.

The energy source of a respective electrical subsystem is connected directly in particular only to that very electrical subsystem and is connected to the other electrical subsystem only indirectly via the power module. The same applies similarly to the consumer, which is correspondingly connected directly only to one electrical subsystem, but is connected to the other electrical subsystem only indirectly via the power module. A respective energy source is in particular connected to only one component electrical system of a respective electrical subsystem and is therefore connected to further component electrical systems only indirectly, in particular via the power module. The power module is therefore an intermediary or distributor between the two electrical subsystems and in particular also between the component electrical systems. The power module in particular also marks a boundary between the two electrical subsystems and so to speak separates them from one another. Preferably, the two electrical subsystems are connected to one another exclusively via the power module. A consumer, on the other hand, is in particular connected directly to at least two component electrical systems of one of the electrical subsystems, with the result that a redundant link is realized. A comfort consumer, on the other hand, is connected, as are the energy sources, in particular to only one component electrical system.

The statements apply accordingly also to configurations having a plurality of safety-relevant consumers which are either all connected to one of the electrical subsystems or which are alternatively distributed among the two electrical subsystems. Likewise, the statements also apply accordingly to configurations having more than two electrical subsystems and also to configurations in which a plurality of electrical subsystems each have a plurality of component electrical systems. In the text which follows, however, without any restriction to generality, it is first assumed that there are two electrical subsystems and two component electrical systems per electrical subsystem. Such a configuration is also particularly preferred.

An essential advantage of the invention is in particular that power is supplied to a respective safety-relevant consumer via two separate power supply lines and in this case power can be supplied to said consumer via each of the two power supply lines from at least two different energy sources. Therefore, the supply of energy to the consumer to a certain extent has double redundancy, namely once owing to the two power supply lines and furthermore owing to the supply from two energy sources via each of the two power supply lines.

A further advantage in particular consists in that, owing to the multiplicity of possibilities for supplying energy to the consumer, precisely this consumer is particularly well protected from a fault event in one of the electrical subsystems or one of the component electrical systems or at one of the components connected thereto, for example one of the electrical stores.

Particularly preferred, in particular in connection with a vehicle, is a configuration in which the consumer is connected to that of the two electrical subsystems which has the higher voltage layer. If the first electrical subsystem has the lower voltage layer, the consumer is then connected to the second electrical subsystem, i.e. to the subsystem with the higher, in relation thereto, voltage layer. As a result, a configuration is realized in which a safety-relevant consumer is operated at the higher voltage, with the result that this consumer is, on the one hand, optimally safeguarded and, on the other hand, is also advantageously supplied a higher power at a lower current, in comparison with a corresponding consumer at a lower voltage.

Particularly advantageous is also a configuration in which the vehicle electrical system has at least two safety-relevant consumers, which are each connected to the two electrical subsystems by two power supply lines in the above-described manner. In other words: the vehicle electrical system has a first safety-relevant consumer, which is connected to the first electrical subsystem, wherein this first electrical subsystem has two component electrical systems, and the first consumer is connected to the two component electrical systems, with the result that the first consumer is connected to the energy source of the first electrical subsystem via two separate power supply lines. Furthermore, the vehicle electrical system has a second safety-relevant consumer, which is connected to the second electrical subsystem, wherein this second electrical subsystem likewise has two component electrical systems, and the second consumer is connected to the two component electrical systems, with the result that the second consumer is connected to the energy source of the second electrical subsystem via two separate power supply lines. Overall, therefore, in each electrical subsystem, i.e. on different voltage layers, energy is supplied to at least one consumer with double redundancy.

In a suitable configuration, the first electrical subsystem has a voltage layer of 12 V, and the second electrical subsystem has a voltage layer of 48 V, and the consumer is connected to the second electrical subsystem. The vehicle electrical system accordingly has a 12 V electrical subsystem and a 48 V electrical subsystem. The consumer is a 48 V consumer. It is essential here that a safety-relevant consumer is operated at the higher of the two voltage layers and in the process is safeguarded particularly optimally with redundancy, as has already been described more generally above. The values 12 V and 48 V in this case relate in particular to the nominal voltage and not to the actual voltage, which typically is slightly above or below the nominal voltage, for example up to 10% higher or lower.

The respective energy source is preferably an electrical store, in particular a battery or a supercap, i.e. a supercapacitor. A generator, i.e. an electric machine which is operated as a generator, is also advantageous as energy source. In a preferred configuration, a first electrical store is connected as first energy source to the first electrical subsystem. A second electrical store is connected as second energy source to the second electrical subsystem, and a generator, for example a generator of the vehicle, is connected as an additional energy source. Overall, the vehicle electrical system in this configuration has three energy sources.

Preferably, the generator and the electrical store are connected to different component electrical systems of the second electrical subsystem. This is not essential per se, but has the advantage that the two energy sources of the second electrical subsystem are distributed among different component electrical systems and, in the event of a fault in one of the component electrical systems, potentially only one energy source fails, while the other energy source can continue to be used. The concepts with two energy sources and with energy sources distributed among different component electrical systems are in principle also advantageous for the first electrical subsystem and can also be applied thereto.

The two electrical subsystems are generally in particular DC systems. The power module connects the two electrical subsystems and therefore also different voltage layers, which are correspondingly converted by means of the power module. Preferably, the power module has at least one DC-DC converter, via which the two electrical subsystems are connected to one another, for supplying energy to one electrical subsystem from the other electrical subsystem, and vice versa. The DC-DC converter accordingly serves to convert the voltage layers. In the configuration with a 48 V electrical subsystem and a 12 V electrical subsystem, the DC-DC converter is accordingly a 48 V/12 V converter. The DC-DC converter additionally represents a boundary between the first and the second electrical subsystems.

Particularly preferred is a configuration in which both electrical subsystems each have two component electrical systems, and wherein the power module has two in particular identical DC-DC converters. A first of the two DC-DC converters connects a first component electrical system of the first electrical subsystem to a first component electrical system of the second electrical subsystem. A second of the two DC-DC converters then similarly connects a second component electrical system of the first electrical subsystem to a second component electrical system of the second electrical subsystem. Therefore, in each case two component electrical systems from different electrical subsystems are connected via a DC-DC converter. To this extent, the power module is advantageously designed with redundancy with respect to the DC-DC converters. Since the component electrical systems of an electrical subsystem are also connected to one another, even in the event of a fault in one of the DC-DC converters, each component electrical system and each consumer connected thereto can itself continue to be supplied power from any other component electrical system to which an energy source is connected. The two DC-DC converters also represent a boundary between the first and the second electrical subsystems.

Expediently, the DC-DC converters at the same time each act as switches in order to electrically disconnect the electrical subsystems connected thereto from one another in the event of a fault.

In one advantageous configuration, the two electrical subsystems each have two component electrical systems, and the two component electrical systems of the first electrical subsystem are connected disconnectably to one another via a first switch. Similarly, in this case also the two component electrical systems of the second electrical subsystem are connected disconnectably to one another via a second switch. The switches are used in particular for disconnecting a respective component electrical system in the event of a fault, i.e. if a fault event occurs in one of the component electrical systems, this component electrical system is disconnected from the remaining component electrical systems by virtue of the fact that the corresponding switch is opened. Otherwise, i.e. during normal operation and without a fault event, the switches are closed, on the other hand, in order to correspondingly connect the component electrical systems to one another and to ensure advantageous redundancy. The switches are in each case in the form of semiconductor switches, for example, or alternatively in the form of relays or contactors.

Preferably, the two switches are integrated in the power module, i.e. the switches are each component parts of the power module. Overall, the switches and the DC-DC converters are then advantageously combined in the power module, with the result that the overall connection of the component electrical systems is particularly compact and also concentrated spatially, i.e. can be accommodated and is preferably also accommodated at a single location in the vehicle. The components of the power module are therefore not arranged so as to be distributed over the vehicle.

Particularly preferred is a combination of the configuration having two switches with the configuration having two DC-DC converters. This results in a power module having a particularly high degree of integration. The switches in this case connect the component electrical systems within a respective electrical subsystem, while the DC-DC converters connect the electrical subsystems to one another. By virtue of corresponding switchover of the switches and the DC-DC converters, the component electrical systems can then be connected to one another virtually as desired, for maximum redundancy, and in the event of a fault can be disconnected from one another particularly flexibly. In the case of two electrical subsystems each having two component electrical systems, the first switch then connects the component electrical systems of the second electrical subsystem, the second switch connects the component electrical systems of the second electrical subsystem, the first DC-DC converter connects the two first component electrical systems of the two electrical subsystems, and the second DC-DC converter connects the two second component electrical systems of the two electrical subsystems.

Overall, therefore, a particularly compact configuration results since the entire connection of the component electrical systems and electrical subsystems to one another and therefore also the redundant power supply to the consumer is realized by the power module. The power supply with double redundancy to a safety-relevant consumer is preferably completely realized by the power module; all functions used in this case are expediently integrated in the power module. A function is in particular an adaptation of the voltage as required in order to supply energy to the consumer in one electrical subsystem from the other electrical subsystem. For this purpose, the power module, as described, has one or more DC-DC converters. Another function is in particular to connect or disconnect the electrical subsystems and in particular the component electrical systems thereof to one another or from one another depending on requirements. For this purpose, the power module, as described, has one or more switches. The power module is itself particularly compact and is installed in the vehicle, for example, in place of a 12 V battery in the engine compartment or in a spare wheel cavity in the trunk. The power module has a particularly high degree of integration.

Preferably, the power module has a dedicated terminal for each component electrical system, with the result that the component electrical systems of an electrical subsystem are connected to one another only via the power module and at the consumers. The terminals are each in the form of a pole to which the consumers, comfort consumers and energy sources of the respective component electrical system are connected outside the power module. The terminals for a respective electrical subsystem are in particular connected via a switch, as described above. A DC-DC converter is arranged between the terminals of different electrical subsystems, as described above. In the case of two electrical subsystems each having two component electrical systems, the power module has in total four terminals. Outside the power module, the two electrical subsystems are preferably not connected to one another. Also, the component electrical systems, in an advantageous configuration, are not connected to one another outside the power module.

For the arrangement of a respective energy source, there are in principle two different variants, which are both advantageous and preferred. In a first variant, the energy source is arranged outside the power module and is formed separately therefrom, which results in a corresponding flexibility. In a second variant, on the other hand, the energy source is integrated in the power module, which results in a particularly compact configuration. In a particularly preferred configuration, at least one energy source in each case of the first and of the second electrical subsystem is in the form of an electrical store, i.e. for example in the form of a battery or supercap, and is integrated in the power module. Therefore, the power module already provides an energy source in the form of an electrical store for each of the two electrical subsystems, with the result that such an electrical store does not also need to be connected externally in addition. As a result, a particularly high degree of integration is achieved. Expediently, however, a generator is connected externally, as described above, in order to charge the two electrical stores.

In a suitable configuration, the vehicle electrical system has at least one comfort consumer, which is not safety-relevant and which is connected to one of the energy sources via only one power supply line. The comfort consumer is therefore not connected with redundancy, but is connected only to one of the component electrical systems of only one of the electrical subsystems.

The object is furthermore achieved by a vehicle which has a vehicle electrical system or a power module as described above. The object is also achieved by the use of a power module as described above in a vehicle electrical system and by the use of a power module or a vehicle electrical system as described above in a vehicle.

The object is in particular also achieved by a method for operating a power module or a vehicle electrical system, wherein, in order to disconnect the two component electrical systems of an electrical subsystem, for example in the event of a fault in one of the component electrical systems, a switch, which electrically connects the two component electrical systems during normal operation, is opened, with the result that the two component electrical systems are then electrically disconnected from one another. The above statements in relation to the vehicle electrical system and the power module also apply accordingly to the method. In particular, advantageous method steps result accordingly from the above statements in respect of the behavior of the vehicle electrical system and the power module.

BRIEF DESCRIPTION OF THE FIGURES

In the text which follows, exemplary embodiments of the invention will be explained in more detail with reference to a drawing, in which, in each case schematically.

DETAILED DESCRIPTION OF THE INVENTION

Figure 1:
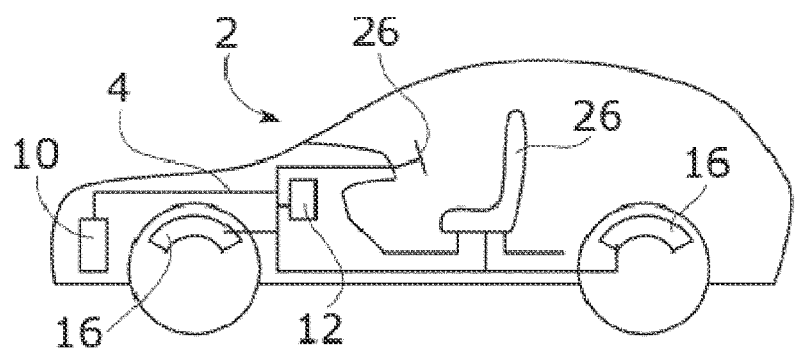
FIG. 1 shows a vehicle having a vehicle electrical system.
Figure 2:
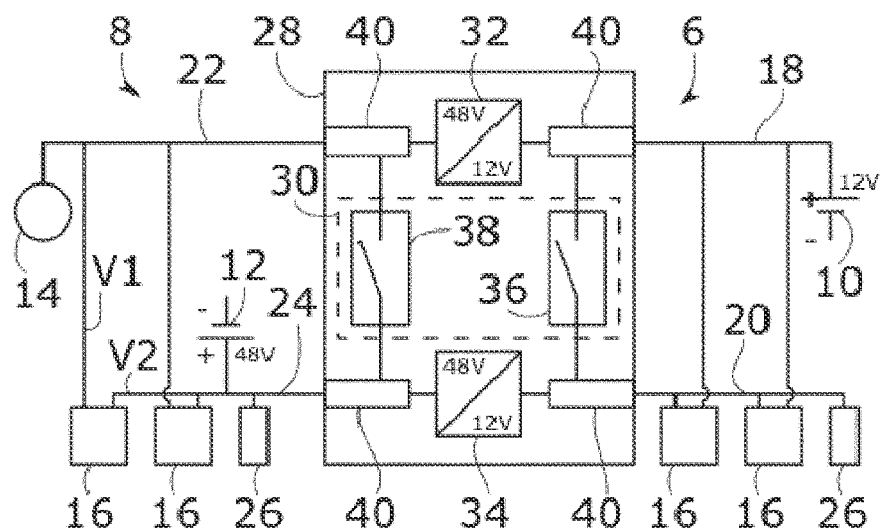
FIG. 2 shows a first variant of the vehicle electrical system from FIG. 1.

FIG. 1 shows a vehicle 2, which has a vehicle electrical system 4, which is merely indicated in very schematized form by connecting lines between a plurality of components of the vehicle 2. The vehicle 2 is a motor vehicle, for example a passenger vehicle or a heavy-goods vehicle, and is driven for example electrically or by an internal combustion engine or both. FIG. 2 shows, in more detail, an exemplary embodiment of a first variant of the vehicle electrical system 4, and FIG. 3 shows, in more detail, an exemplary embodiment of a second variant.

The vehicle electrical system 4 generally has a first electrical subsystem 6 and a second electrical subsystem 8, to which in each case at least one energy source 10, 12, 14 is connected. The first electrical subsystem 6 has a different, in this case a lower, voltage layer than the second electrical subsystem 8. At least one first energy source 10 is connected to the first electrical subsystem 6, and at least one second energy source 12 is connected to the second electrical subsystem 8. The energy source 10, 12, 14 of the respective electrical subsystem 6, 8 fixes the voltage layer thereof. In the exemplary embodiments shown, the voltage layer of the first electrical subsystem 6 is 12 V, and the voltage layer of the second electrical subsystem 8 is 48 V, but in principle other voltages are also possible and suitable.

The vehicle electrical system 4 has at least one, and in this case by way of example four, safety-relevant consumers 16, which are each connected to one of the electrical subsystems 6, 8. In this case, each electrical subsystem 6, 8 has two component electrical systems 18, 20, 22, 24, and a respective consumer 16 is connected to the two component electrical systems 18, 20, 22, 24 of a single electrical subsystem 6, 8, with the result that the consumer 16 is connected to the energy source 10, 12, 14 of the corresponding electrical subsystem 6, 8 via two separate power supply lines V1, V2.

Figure 3:
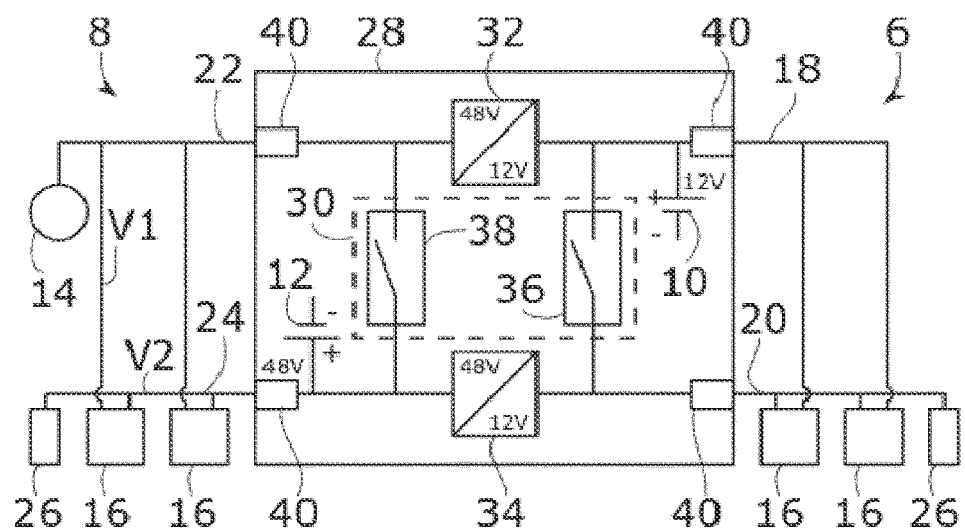
FIG. 3 shows a second variant of the vehicle electrical system from FIG. 1.

This is shown by way of example in FIGS. 2 and 3 for one of the consumers 16, but as will become clear, all four consumers 16 are each connected separately via two connecting lines V1, V2. The respective energy source 10, 12, 14 is connected to only one of the component electrical systems 18, 20, 22, 24, but the two component electrical systems 18, 20, 22, 24 of a respective electrical subsystem 6, 8 are connected to one another in such a way that power is supplied to the two component electrical systems 18, 20, 20, 24 from the associated energy source 10, 12, 14. Therefore, each of the two electrical subsystems 6, 8 is divided into two component electrical systems 18, 20, 22, 24, which both each comprise one of the power supply lines V1, V2, with the result that energy can be supplied to the consumer 16 via different component electrical systems 18, 20, 22, 24, i.e. said consumer is connected to the energy source 10, 12, 14 with redundancy. One or more comfort consumers 26 which may be present are in contrast each connected only to a single component electrical system 18, 20, 22, 24, i.e. are not supplied power with redundancy.

The safety-relevant consumers 16 each perform a safety-relevant function and serve the purpose of ensuring the safety and the integrity of the vehicle 2 or one or more occupants of a vehicle 2 or other road users in a reliable and operationally safe manner. Safety-relevant consumers of a vehicle are, for example, as shown in FIG. 1, a brake system or a steering system or, in a variant which is not shown, alternatively or additionally active roll stabilization, a drive system, a chassis control system, an airbag, a system for ensuring the vehicle stability or the like. Safety-relevant consumers 16 should be distinguished from comfort consumers 26, which do not actually perform any safety-relevant function, but merely one or more comfort functions. Examples of comfort consumers 26 are a seat adjustment system, as can be seen in FIG. 1, or alternatively or in addition an air-conditioning system, an audio system or the like.

Furthermore, the vehicle electrical system 4 has a power module 28, which connects the two electrical subsystems 6, 8 to one another, and which is designed in such a way that each of the two power supply lines V1, V2 is connectable to all of the energy sources 10, 12, 14, with the result that power can be supplied to the consumer 16 via the two power supply lines V1, V2 in each case from all of the energy sources 10, 12, 14. The consumer 16 is therefore connected not only to an individual energy source 10, 12, 14 in the same electrical subsystem 6, 8 with redundancy, but is also connected to one or more energy sources 10, 12, 14 from the other electrical subsystem 6, 8. In addition to the redundancy of the connection, accordingly also a redundancy of the energy supply is realized.

The power module 28 is overall used for distributing the electrical energy from the energy sources 10, 12, 14 amongst the various electrical subsystems 6, 8 and component electrical systems 18, 20, 22, 24 and therefore ensures the described redundancy of the energy supply to the consumer 16. The power module 28 in the exemplary embodiments shown is an electrical circuit, which in this case has a printed circuit board 30, on which suitable component parts for realizing the functionality of the power module 28 are arranged and interconnected.

A respective energy source 10, 12, 14 is connected directly only to one of the electrical subsystems 6, 8 and is connected to the other electrical subsystem 6, 8 only indirectly via the power module 28. The same similarly applies to the consumers 16 and also to the comfort consumers 26, which are each connected directly only to one electrical subsystem 6, 8, but to the other electrical subsystem 6, 8 only indirectly via the power module 28. A respective energy source 10, 12, 14 is additionally also connected only to one of the component electrical systems 18, 20, 22, 24 and is therefore connected to the remaining component electrical systems 18, 20, 22, 24 only indirectly, namely via the power module 28. A respective consumer 16, on the other hand, is connected directly to at least two component electrical systems 18, 20, 22, 24 of one of the electrical subsystems 6, 8, with the result that a redundant link is realized. A respective comfort consumer 26, on the other hand, is connected to only one component electrical system 18, 20, 22, 24.

As described already, the first electrical subsystem 6 in FIGS. 2 and 3 has a voltage layer of 12 V, and the second electrical subsystem 8 has a higher voltage layer than this of 48 V. A particular feature is that at least one safety-relevant consumer 16 is connected to the second electrical subsystem 8 and is operated on the higher voltage and in this case is supplied energy with redundancy. This is in principle independent of which and how many consumers 16 and comfort consumers 26 are connected to the first electrical subsystem 6 at 12 V and how the energy sources 10, 12, 14 are distributed.

The energy sources 10, 12 are in this case in each case in the form of electrical stores, in this case even in the form of a battery. As an alternative, a configuration as a supercap is also suitable. A generator is also suitable as energy source 14. In the exemplary embodiments shown, a first electrical store is connected as first energy source 10 to the first electrical subsystem 6, and a second electrical store is connected as second energy source 12 to the second electrical subsystem 8, and a generator is connected as an additional energy source 14, with the result that the shown vehicle electrical systems 4 each have three energy sources 10, 12, 14. Alternatives with a different number of and distribution of energy sources 10, 12, 14 are in principle possible and also suitable if at least one energy source 10, 12, 14 is connected to each of the electrical subsystems 6, 8, with the result that at least one energy source 10, 12, 14 is provided per electrical subsystem 6, 8.

In the exemplary embodiments in FIGS. 2 and 3, the generator 14 and the second electrical store 12 are connected to different component electrical systems 22, 24 of the second electrical subsystem 8. This is not essential per se, but has the advantage that the two energy sources 12, 14 of the second electrical subsystem 8 are distributed among different component electrical systems 22, 24 and, in the event of a fault in one of the component electrical systems 22, 24, potentially only one energy source 12, 14 fails, while the other can continue to be used. This concept is similarly also applicable to the first electrical subsystem 6.

The power module 28 connects the two electrical subsystems 6, 8 and therefore also different voltage layers. In order to supply energy to one electrical subsystem 6, 8 from the other electrical subsystem 6, 8, and vice versa, the power module 28 has at least one and in this case two DC-DC converters 32, 34, via which the two electrical subsystems 6, 8 are connected to one another. The DC-DC converters 32, 34 serve to convert the voltage layers and are in this case specifically in each case in the form of 48 V/12 V converters. The DC-DC converters 32, 34 also represent a boundary between the two electrical subsystems 6, 8.

In the configurations shown in FIGS. 2 and 3, the first electrical subsystem 6 has a first component electrical system 18 and a second component electrical system 20, and the second electrical subsystem 8 likewise has a first component electrical system 22 and a second component electrical system 24. The first DC-DC converter 32 connects the first component electrical system 18 of the first electrical subsystem 6 to the first component electrical system 22 of the second electrical subsystem 8. The second DC-DC converter 34 similarly connects the second component electrical system 20 of the first electrical subsystem 6 to the second component electrical system 24 of the second electrical subsystem 8. Therefore, on the one hand, the first component electrical systems 18, 22 and the second component electrical systems 20, 24 are connected via a respective DC-DC converter 32, 34. Since the component electrical systems 18, 20, 22, 24 of an electrical subsystem 6, 8 are also connected to one another, even in the event of a fault in one of the DC-DC converters 32, 34, power can continue to be supplied to each component electrical system 18, 20, 22, 24 and each consumer 16 connected thereto from any other component electrical system 18, 20, 22, 24 to which an energy source 10, 12, 14 is connected.

The two component electrical systems 18, 20 of the first electrical subsystem 6 are connected disconnectably to one another via a first switch 36. Similarly, the two component electrical systems 22, 24 of the second electrical subsystem 8 are also connected disconnectably to one another via a second switch 38. The switches 36, 38 serve to disconnect a respective component electrical system 18, 20, 22, 24 in the event of a fault by virtue of the corresponding switch 36, 38 being opened. Moreover, i.e. during normal operation and without a fault event, the switches 36, 38 are closed, on the other hand. In the exemplary embodiments shown, the two switches 36, 38 are integrated in the power module 28, namely on the printed circuit board 30. In a variant which is not shown, the DC-DC converters 32, 34 are also fitted on the printed circuit board 30.

As becomes clear from FIGS. 2 and 3, the switches 36, 38 connect a respective first component electrical system 18, 22 to the associated second component electrical system 20, 24 within the same electrical subsystem 6, 8, whereas the DC-DC converters 32, 34 connect the different electrical subsystems 6, 8 to one another. By virtue of corresponding switchover of the switches 36, 38 and of the DC-DC converters 32, 34, the component electrical systems 18, 20, 22, 24 can be connected to one another and disconnected from one another virtually as desired.

In this case, the power module 28 has a dedicated terminal 40 for each component electrical system 18, 20, 22, 24, i.e. in this case four terminals 40. As a result, the component electrical systems 18, 20, 22, 24 of an electrical subsystem 6, 8 are merely connected to one another via the power module 28 and at the consumers 16. The terminals 40 are in each case in the form of a pole to which the consumers 16, comfort consumers 26 and energy sources 10, 12, 14 of the respective component electrical system 18, 20, 22, 24 are connected outside the power module 28. The terminals 40 of a respective electrical subsystem 6, 8 are connected via one of the switches 36, 38. On the other hand, one of the DC-DC converters 32, 34 is arranged between two terminals 40 of different electrical subsystems 6, 8.

A respective energy source 10, 12, 14 is either arranged outside the power module 28 and separately therefrom, as shown in FIG. 2, or alternatively is integrated in the power module 28, as shown in FIG. 3. Specifically in FIG. 3, the energy sources 10, 12 in the form of electrical stores are integrated in the power module 28, whereas the generator 14, as in FIG. 2, is arranged outside the power module 28. The power module 28 in FIG. 3 therefore has an energy source 10, 12 in the form of an electrical store for each of the two electrical subsystems 6, 8, with the result that such an electrical store does not also need to be connected externally in addition.

LIST OF REFERENCE SYMBOLS 2 vehicle
4 vehicle electrical system
6 first electrical subsystem (12 V)
8 second electrical subsystem (48 V)
10 first energy source, first electrical store
12 second energy source, second electrical store
14 energy source, generator
16 safety-relevant consumer
18 first component electrical system (in the first electrical subsystem)
20 second component electrical system (in the first electrical subsystem)
22 first component electrical system (in the second electrical subsystem)
24 second component electrical system (in the second electrical subsystem)
26 comfort consumer
28 power module
30 printed circuit board
32 first DC-DC converter
34 second DC-DC converter
36 first switch
38 second switch
40 terminal
V1, V2 connecting line

The invention claimed is:

1. A vehicle electrical system for use in a vehicle, the electrical system comprising:

a first electrical subsystem and a second electrical subsystem, said first electrical subsystem having a different voltage level than said second electrical subsystem;

at least two energy sources including at least one first energy source and at least one second energy source, said first electrical subsystem connected to said at least one first energy source, said second electrical subsystem connected to said at least one second energy source;

at least one safety-relevant consumer connected to one of said first or second electrical subsystems, wherein said one electrical subsystem has two component electrical systems and said consumer is connected to both said two component electrical systems, with said consumer being connected to said energy source of said one electrical subsystem via two separate power supply lines; and a power module connecting said first and second electrical subsystems to one another, and configured to connect each of said two separate power supply lines to said at least two energy sources, and enabling power to be supplied to said consumer in each case from said at least two energy sources via both said two power supply lines;

each of said first and second electrical subsystems having two component electrical systems, and the power module having two DC-DC converters, which represent a boundary between said first and second electrical subsystems;

a first of said two DC-DC converters connecting a first component electrical system of said first electrical subsystem to a first component electrical system of said second electrical subsystem; and a second of said two DC-DC converters connecting a second component electrical system of said first electrical subsystem to a second component electrical system of said second electrical subsystem;

wherein in each case two component electrical systems from different electrical subsystems are connected via one of said two DC-DC converters.

2. The vehicle electrical system according to claim 1, wherein:

said energy source of a respective electrical subsystem is connected directly only to said respective electrical subsystem and is connected to the other said electrical subsystem only indirectly via said power module; and said consumer is connected directly only to one said electrical subsystem and is connected to the other said electrical subsystem only indirectly via said power module.

3. The vehicle electrical system according to claim 1, wherein said first electrical subsystem has a lower voltage level than said second electrical subsystem.

4. The vehicle electrical system according to claim 1, wherein said consumer is connected to a respective said electrical subsystem which has a higher voltage level.

5. The vehicle electrical system according to claim 1, wherein said first electrical subsystem has a voltage level of 12 V, said second electrical subsystem has a voltage level of 48 V, and said consumer is connected to said second electrical subsystem.

6. The vehicle electrical system according to claim 1, wherein:

a first electrical storage device is connected as a first energy source to said first electrical subsystem;

a second electrical storage device is connected as a second energy source to said second electrical subsystem; and a generator is connected as an additional energy source.

7. The vehicle electrical system according to claim 6, wherein said generator and said second electrical storage device are connected to different component electrical systems of said second electrical subsystem.

8. The vehicle electrical system according to claim 1, wherein:

each of said first and second electrical subsystems has two component electrical systems;

said two component electrical systems of said first electrical subsystem are disconnectably connected to one another via a first switch; and said two component electrical systems of said second electrical subsystem are disconnectably connected to one another via a second switch.

9. The vehicle electrical system according to claim 8, wherein said first and second switches are integrated in said power module.

10. The vehicle electrical system according to claim 8, wherein said power module comprises a dedicated terminal for each of said component electrical systems.

11. The vehicle electrical system according to claim 1, wherein each of said first and second electrical subsystems has an electrical storage device forming said at least one energy source and each is integrated in said power module.

12. The vehicle electrical system according to claim 1, wherein at least one comfort consumer is connected in the vehicle electrical system, which comfort consumer is not safety-relevant and which is connected to one of said energy sources via only one power supply line.

* * * * *